United States Patent Office 3,126,539
Patented Mar. 24, 1964

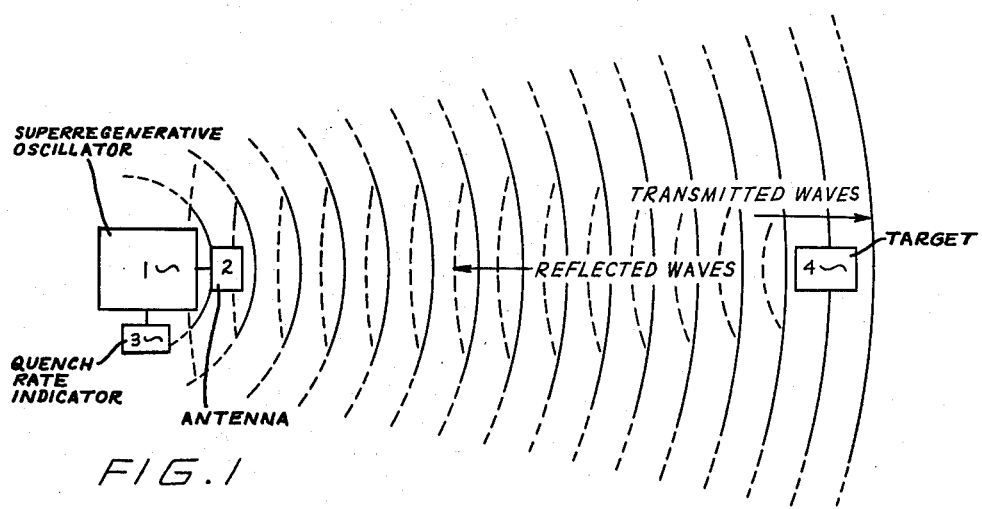
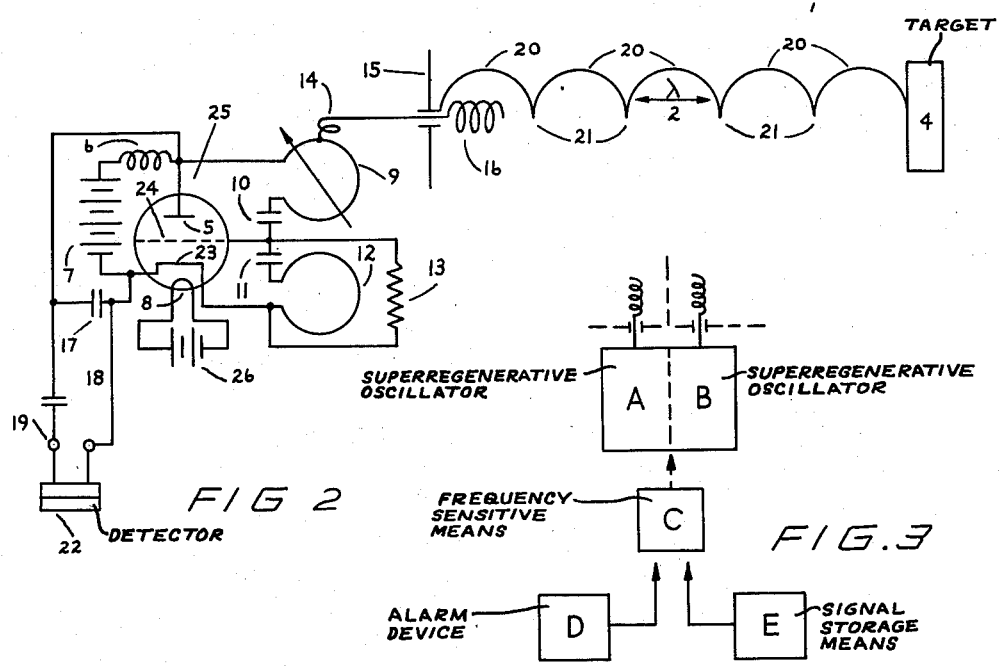

3,126,539
MOTION DETECTOR
Louis B. Mulvey, Main St., Bolton, Mass.
Filed Sept. 18, 1956, Ser. No. 610,526
9 Claims. (Cl. 343—8)

The present invention relates to a ranging and motion detector and in particular to a device capable of detecting and measuring the change in relative orientation between two objects.

The present invention provides a compact device capable of detecting and measuring the relative change in orientation between two objects, as for example, the present invention mounted on a stationary or moving carrier on the one hand, and an automobile or airplane on the other hand.

According to one embodiment of the invention, a self-quenched superregenerative oscillator is suitably coupled to a radiator or antenna, or other suitable transducing means. A range and/or rate indicator or transducer is coupled to the oscillator together with an electrical power source. High frequency energy interrupted at the quench rate, is exchanged between the oscillator and an external object through the transducing means to establish a standing wave between the transducing means and object. This standing wave intercepts the transducing means at a point of substantially constant amplitude under static conditions. However, upon relative movement between the transducing means and the object, the transducing means intercepts points of changing amplitude. The effective impedance presented by the transducing means to the oscillator is a function of the amplitude of the standing wave at the transducing means. The quench rate of the oscillator is a function of the effective impedance presented by the transducing means. Hence, when the transducing means intercepts a different point in the standing wave pattern, the resulting change in effective impedance presented to the oscillator is reflected in an alteration of the quench rate. As a result, even slight changes in the relative orientation between the transducing means and object are detected by monitoring the quench rate.

Moreover, if there is a relative movement between the object and transducing means along the radial line of direction joining them, successive maxima and minima in the standing wave pattern are intercepted by the transducing means at a rate proportional to the relative radial velocity between the transducing means and object, causing corresponding changes in the quench rate. Thus, a shift in the quench rate indicates a change in the relative orientation between antenna and object while the rate of such shift is proportional to the relative radial velocity.

The change in quench rate is detected by a conventional slope, ratio, phase, locked-oscillator, or other FM detector system tuned to the basic quench frequency. The information thus obtained is suitably indicated by an aural or visual indicator, transducer, alarm, electrical or mechanical relay, or the information may be suitably coupled to an electrical circuit to amplify, transmit, transform, store or otherwise transfer, display or use the signal generated by and derived from the invention.

The device described is novel in that target radial velocity information is simply derived as described above without complex circuity common to conventional Moving Target Indicator or Doppler systems. No automatic frequency control circuits are required. No local beat frequency oscillator is required. The transmitter and receiver function is performed by the same circuit components, so that drift in the high frequency caused by temperature and moderate power source fluctuations does not adversely affect the operation of the equipment. Because the circuit may be manufactured in a structure relatively compact and inexpensive in nature, particular applications of the present invention are widespread. Thus, for example, the present invention may be utilized for military purposes. As, for example, the unit, which can be manufactured in a complete compact container not greater than the size of a 6 ounce tumbler may be attached to or formed as a part of a military battle helmet with the radiator consisting of a short flexible antenna or other suitable radiator projecting therefrom. The detector may consist essentially of earphones which will afford the wearer an audible alarm indicating the presence of any moving target in the vicinity. Further, since the unit is a sensitive superregenerating detector of its fundamental high frequency ($f_0$), it may be used for receiving amplitude or frequency modulated radio frequency signals from suitable RF transmitters. The unit itself might also be used by a simple adaptation for modulation; as for example, by microphone or key at the anode or grid or cathode or voltage supply of the vacuum supply, to enable the transmission of signals.

Further applications of the present invention permit its incorporation into moving bodies such as airplanes to detect the relative movement of other planes nearby. In this instance, omni-directional antennas or alternatively several units having differently oriented radiation patterns would be preferred. Thus, small units of this nature could be incorporated into the structure of an airplane to detect the approach of other aircraft from positions obscure to the pilot. As this device can be constructed to detect from distances of from zero to several thousand feet, this type of close detection would be of particular value.

The scope of the present invention is not limited to military application, but may be extended to commercial uses. Thus, the present invention may be utilized as a portable speed detector for use by police forces. With suitable battery operation, the entire unit may be carried in one's pocket and be put to an immediate use by simply turning the unit on and directing the antenna towards a moving object such as an automobile.

The present invention contemplates the use of the structure in such fields as radar detectors which may be mounted on automobiles to detect and warn of the rapid approach of or rapid approach to another car or stationary object. With suitable coupling of the present invention to a unit for detecting distance and by suitably integrating the result obtained, a warning signal may be derived which would indicate whether an automobile bearing the present invention was approaching another auto or stationary object at too great a rate. A further extension of the present invention would contemplate its incorporation into the braking system of an automobile, whereby brakes might be automatically applied if the rate of approach previously described was excessive.

These and other objects of the present invention and a further and more explicit explanation of its operation will be more clearly understood when considered in connection with the accompanying drawings, in which:

FIGURE 1 is a schematic block diagram illustrating the operation of the invention, FIGURE 2 is a schematic diagram of an operative circuit, and FIGURE 3 is a block diagram of a modification of the invention.

Referring to FIGURE 2, there is illustrated a circuit of a superregenerative radio frequency oscillator coupled at its output to a suitable detector 22 and a radiating device 16. The oscillator is tuned to an oscillating frequency in the microwave region of the radio spectrum, such as, for example, to a frequency of 1680 megacycles. The oscillator is further tuned to a self-quench frequency of a much lower radio frequency, as, for example, 1 megacycle.

The circuit of FIGURE 2 will be described in connection with a specific embodiment of the invention; however, it should be understood that the specific embodiment described is for illustrative purposes only and may be varied in accordance with practices well known in the art. The plate 5 of the triode tube 25, illustrated in FIGURE 2, is connected through the RF choke 6 to the 120 volt voltage source 7, with the other terminal of the voltage source being connected to the cathode 23. The heater voltage for the filament 8 is provided by another power source of suitable magnitude 26. An RF by-pass capacitor 17 is connected in parallel with the choke 6 and power source 7. The RF choke 6 and by-pass capacitor 17 are tuned to resonate at or near the quench frequency $f_q$, which in the specific embodiment described, is 1 megacycle.

Connected across the by-pass condenser 17 is a suitable detector 22 in series with the blocking capacitor 18. A tapped inductance 9 and a condenser 10 are connected in series between the plate and grid, while the condenser 11 and inductance 12 are connected in series between the grid and cathode. A grid leak resistor 13 is connected in parallel with the capacitor 11 and inductance 12. The inductance 14 is connected between the antenna 16, which is capable of transmitting and receiving signals, and a tap on inductance 9. It is noted the inductance 14 may be proper selection of the circuitry actually be a capacitance rather than an inductance. The antenna 16 may be provided with a suitable reflective and reinforcing element 15 such as a parabolic reflector.

The components hereinbefore described should be selected in magnitude to operate in a manner known to the art as a superregenerative radio frequency oscillator. In this connection, it is noted that the RC time constant of the resistor 13 and capacitor 11 are determinative of the quench frequency $f_q$. When the time constant of the grid leak resistor-condenser combination is too large to permit the bias to re-adjust itself with the rapidity necessary to follow the changes in amplitude produced by random effects, an interruption of the oscillation at the frequency $f_0$ will occur, with this interruption occurring at an audio or radio frequency rate, in this case at a rate of 1 megacycle. It is noted that when interrupted oscillations are produced, the rate of interruption is of the order of $1/RC$ times per second, where R and C are ohms and farads respectively. In the absence of any incoming signal, oscillations are initiated by thermal agitation noises, built up to a critical amplitude, and then die out. An incoming signal larger than the thermal noises then causes the build up time to be advanced, so that the peak is reached sooner than would otherwise be the case and the oscillations die out sooner. In the device as illustrated, the incoming signal is derived from the standing wave created between the antenna 16 and the target 4.

This incoming signal which is derived from a standing wave will be understood from a consideration of FIGURE 1, in which the block diagram includes the super-regenerating oscillator 1, the radiator or antenna 2 and the range or rate indicator or transducer 3. The antenna 2 radiates a power at a frequency $f_0$. This frequency intercepts the target 4 which is a moving target relative to the antenna 2. The waves reflected from the target 4 and directed back towards the antenna 2 create standing waves between the antenna 2 and the target 4. As the target 4 is moving relative to the antenna, successive maxima and minima of the reflective waves are intercepted by the antenna 2. These maxima will be intercepted at a rate $f_1$ proportionate to the rate of movement of the target 4 relative to the antenna 2. Thus, if the target 4 is moving rapidly towards or away from the antenna 2, the successive maxima of the frequency $f_0$ will intercept the antenna at a rapid rate. If on the other hand, the target 4 is stationary relative to the antenna 2, there will be no successive interceptions of the maxima of the frequency $f_0$ ($f_1=0$). This reflective signal as measured by the rate or frequency ($f_1$) at which the successive maxima $f_0$ points are intercepted by the antenna provides an incoming signal to the oscillator proportionate to the relative rates of speed of the two objects, namely the antenna 2 and target 4. These pulses of incoming signal will frequency-modulate the basic quench frequency $f_q$ by a factor $\Delta f_q$ with $\Delta f_q$ in this case being within a range of approximately + or −0.075 megacycle. The variation of the quench frequency $f_q$ may be suitably detected by an FM detector 22 as shown in FIGURE 2. The tuned circuit of the FM detector is, in this case, resonant to a frequency of 1 megacycle which is the quench frequency $f_q$. It is, therefore, possible by the use of the present invention to determine rate information from a moving object relative to the transmitting receiving antenna of the present invention.

Several types of superregenerative oscillator circuits may be utilized. In an exemplary embodiment of the present invention a JAN-5794 type cavity-contained triode oscillator with a properly selected grid leak resistor 13 was found suitable. The radiator preferable in the present invention was found to be a 7-turn helix with a five-inch diameter metal ground reflector 15. Other types of radiators, and transducing means may, however, be utilized. This particular system was selected because of its simplicity, directivity and small size and because of the ability of the helical array to radiate and receive circularly-polarized radio frequency energy. Other types of antennas which could possibly be used, include a rod antenna, a horn radiator, a slot antenna or a dielectric lens antenna or radiator.

The output transducer which may be connected to the receiver 22 is dependent upon the particular type of interpretation desired. For example, a loudspeaker could be used to emit audible tones as the target moves through the standing wave field in the vicinity of the invention; in this case, the frequency of the tone is proportional to the radio velocity of the target relative to the device. On the other hand, a standard AM radio tuned to the super-regenerative quench frequency radiated by the device demodulates and amplifies the signal and emits a similar audible tone. A FM detector and amplifier and loudspeaker similarly demodulates the frequency modulated component of the quench signal. If desired, connections may be made directly to other transducers, such as alarms, storage devices, frequency sensitive relays, etc. dependent upon the particular use desired. Further a meter may be connected across the receiver 22 calibrated in miles per hour or other suitable rates for determining directly by reading the velocity of the target 4.

FIGURE 3 illustrates a modification of the device shown in FIGURE 2, which consists of a bridged system of two oscillating vacuum tubes and coupling elements and separate radiators or antennas. The use of the bridged system device shown in FIGURE 3 is that of a relative motion detector which is relatively insensitive to power source voltage surges. Blocks A and B each represent self-quenched superregenerative devices similar to that shown in FIGURE 2. The anode side of terminals 19 of each device A and B are bridged by a frequency-sensitive amplifier and/or indicator C, or by a relay coupled to an alarm device, etc. D, or by the input of an electrical or electrical/mechanical signal-storage device, etc. E. The power source referred to above may be common to sections A and B or may be separately connected to each and may be derived from batteries or any other power source.

The bridged system device operates in such a manner that only a moving target relative to the position of the device or a circuit failure of the device itself will cause a signal to appear at the anode side of either terminal 19, thus activating an alarm or indicating device. Thus power source fluctuations will not adversely affect the operation of the device. Such a unit would be particularly applicable in units constructed for burgler alarm purposes.

The specific circuits and transducing means described herein are by way of example only. It is evident that those skilled in the art may now make numerous modifications of and departures from the specific exemplary embodiments described herein without departing from the inventive concepts. Consequently, the invention is to be construed as limited only by the spirit and scope of the appended claims.

Having now described my invention, I claim:

1. A device for detecting relative movement between a target and said device comprising a superregenerative radio frequency oscillator adapted to generate a microwave frequency signal at a self-quenching frequency rate lower than the frequency of said signal, a radiator coupled to said oscillator adapted to radiate said signal and intercept said radiated signal return from said target and deliver said returned signal to said oscillator, and a detector electrically coupled to said oscillator for detecting the rate of change of said self-quenching frequency rate.

2. A ranging and motion detector comprising a super-regenerative radio frequency oscillator having a tuned frequency in the microwave region of the radio spectrum and a self-quenching frequency of a substantially lower radio frequency rate, a radiator electrically coupled to the output of said oscillator for transmitting energy to and receiving the transmitted energy returned from a target, a frequency modulation detector tuned to said self-quenching frequency, and a transducer electrically coupled to said frequency modulated detector for indicating the rate of change of the self-quenching frequency rate of said oscillator.

3. In a motion detector device the combination of a super-regenerative oscillator, a frequency modulation detector for detecting variations in the rate of change of the quench rate of the super-regenerative oscillator, and means for coupling a signal characteristic of said quench rate to said frequency modulation detector.

4. Object sensitive apparatus comprising, a source of electrical oscillations of a first frequency interrupted at a rate lower than said first frequency, transducing means for coupling said source to an external object whereby changes in the relative position between said source and object cause changes in said rate, and means responsive to the rate of change of said first-mentioned rate for providing a signal indicative of a component of the relative velocity between said transducing means and said object.

5. Apparatus in accordance with claim 4 wherein said transducing means includes means for radiating circularly polarized energy.

6. Apparatus in accordance with claim 5 wherein said means for radiating circularly polarized energy includes planar reflecting means and a helical antenna on one side of said reflecting means with the antenna axis perpendicularly oriented with respect to said reflecting means.

7. Object sensitive apparatus comprising, an oscillator, radiating means for coupling said oscillator to said object, said radiating means radiating circularly polarized energy toward said object and delivering said radiated energy returned from said object to said oscillator, said oscillator providing an output signal characteristic of a property of said returned energy representative of the change in the relative orientation between said object and said radiating means, and means responsive to the latter output signal for deriving an indication of change in the relative orientation between said object and said radiating means.

8. Object sensitive apparatus comprising, a super-regenerative oscillator tuned to a first high frequency and characterized by a self-quenching frequency much lower than said first frequency, radiating means electrically coupled to the output of said oscillator, and a frequency modulation detector responsive to the rate of change of said self-quenching frequency.

9. Object sensitive apparatus comprising, a super-regenerative oscillator, and frequency sensitive means coupled to said oscillator for detecting the rate of change of the quench rate of said oscillator.

References Cited in the file of this patent

UNITED STATES PATENTS

| | | |
|---|---|---|
| 2,400,309 | Kock | May 14, 1946 |
| 2,535,401 | Emerson | Dec. 26, 1950 |
| 2,553,018 | Strafford | May 15, 1951 |
| 2,596,996 | Hansen et al. | May 20, 1952 |
| 2,851,681 | Cohn | Sept. 9, 1958 |

FOREIGN PATENTS

| | | |
|---|---|---|
| 581,165 | Great Britain | Oct. 3, 1946 |
| 585,988 | Great Britain | Mar. 4, 1947 |